(12) United States Patent
Mogul

(10) Patent No.: US 7,512,705 B2
(45) Date of Patent: Mar. 31, 2009

(54) TRUNCATING DATA UNITS

(75) Inventor: Jeffrey Mogul, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 784 days.

(21) Appl. No.: 11/000,396

(22) Filed: Dec. 1, 2004

(65) Prior Publication Data
US 2006/0117099 A1    Jun. 1, 2006

(51) Int. Cl.
*G06F 15/16* (2006.01)
(52) U.S. Cl. .................. 709/238; 709/236; 370/468
(58) Field of Classification Search ......... 709/200–202, 709/220–224, 238, 236; 370/468
See application file for complete search history.

(56) References Cited

U.S. PATENT DOCUMENTS

| | | | | |
|---|---|---|---|---|
| 6,052,362 A | * | 4/2000 | Somer | 370/246 |
| 6,151,316 A | * | 11/2000 | Crayford et al. | 370/356 |
| 6,157,623 A | * | 12/2000 | Kerstein | 370/315 |
| 6,618,759 B1 | * | 9/2003 | Lefebvre et al. | 709/235 |
| 6,862,639 B2 | * | 3/2005 | Chirco et al. | 710/112 |
| 6,987,770 B1 | * | 1/2006 | Yonge, III | 370/401 |

* cited by examiner

*Primary Examiner*—Moustafa M Meky

(57) ABSTRACT

A data unit is received in a first device via a network. A truncated copy of the data unit is generated. The truncated copy of the data unit is transmitted to a monitoring device through a link.

15 Claims, 5 Drawing Sheets

TRUNCATING DATA UNITS

BACKGROUND

Computer networks allow computers to exchange information and share resources such as files, printers, modems, and storage units. Typically, traffic (data transmitted from computer to computer in a computer network) on a computer network includes the transmission of data packets. Traffic on a computer network may be monitored to collect information about the computer network and the traffic on the computer network. This information may be used for various purposes, such as network performance monitoring, network debugging, connectivity analysis, and so forth.

Network managers may use network monitors to collect statistical information and debugging information about packets on the computer network. One example of monitoring a network is to copy or "mirror" packets at a switch or router, and transmit the mirrored packets to a monitoring device over a mirroring port. Thus, a switch may mirror packets from multiple real-traffic ports onto one (or a few) mirroring ports over some type of link. The mirroring port, the monitoring device and the link connecting the mirroring port to the monitoring device may each have a bandwidth parameter within which the mirroring should occur.

It would be desirable to provide a high traffic rate to the monitoring device while staying within a bandwidth parameter of a mirroring port, the monitoring device and a link between a the mirroring port and the monitoring device.

SUMMARY OF THE INVENTION

A data unit is received in a first device via a network. A truncated copy of the data unit is generated. The truncated copy of the data unit is transmitted to a monitoring device through a link.

BRIEF DESCRIPTION OF THE DRAWINGS

Features of the present invention will become apparent to those skilled in the art from the following description with reference to the figures, in which.

DETAILED DESCRIPTION OF THE INVENTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

In this application, the term "port mirroring" will refer to the process of making a copy of a data packet at a port of a switch or a router and forwarding the copy of the packet to another port to monitor network traffic. The port to which the copy is forwarded will be referred to as the "mirroring port." The mirroring port may forward the copy to a remote monitoring device.

A process for forwarding a packet in a network is described. The process may occur at a switch or a router in the network. The process includes making a copy of a data packet at either an input or an output port of the switch or router, and forwarding the copy to a remote monitoring device. The copy forwarded to the monitoring device may be truncated before being transmitted to the monitoring device based on a truncation application. The truncation application may be implemented to use various techniques to determine amount of truncation and/or which packet(s) will be truncated.

Figure 1:
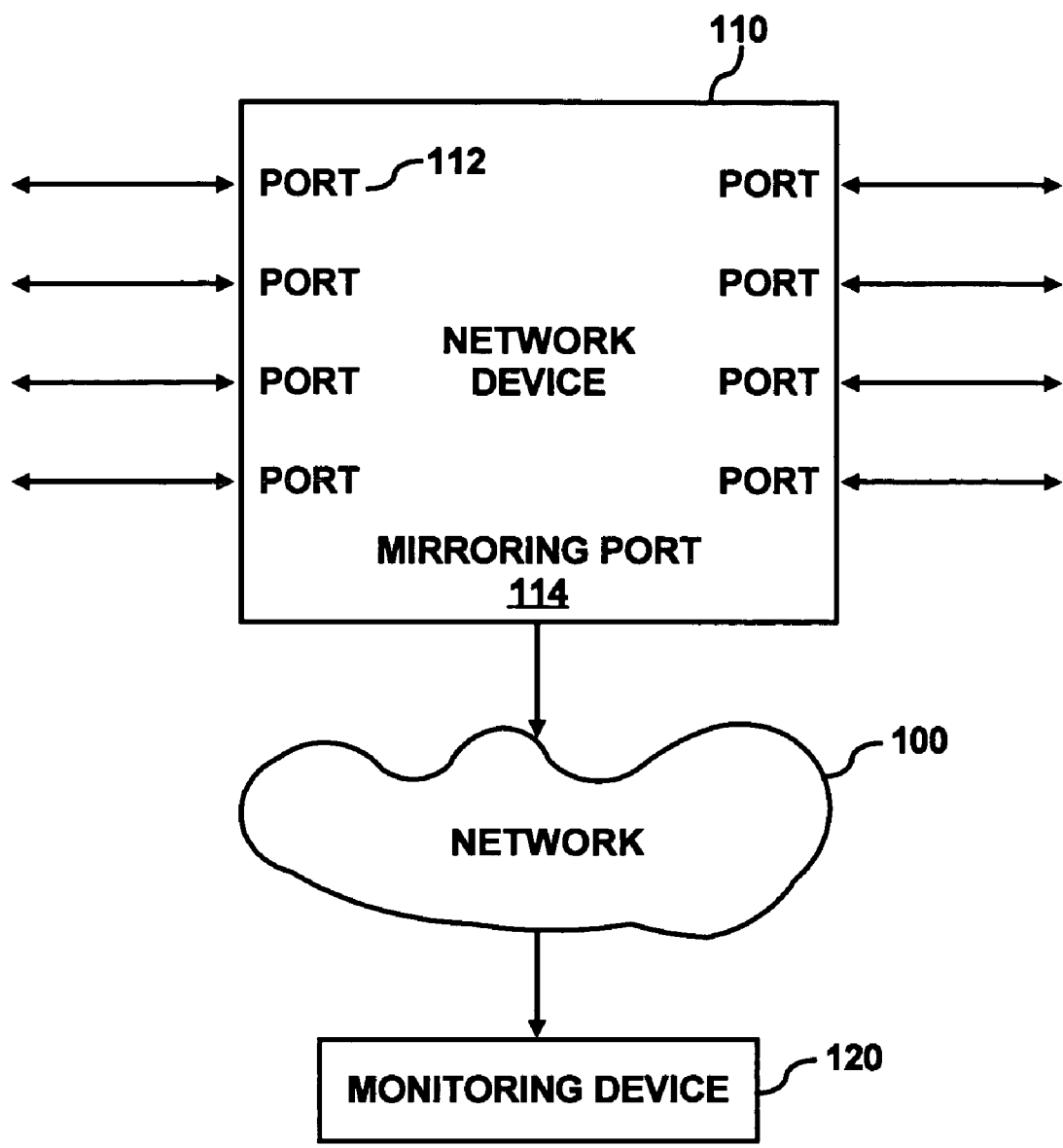
FIG. 1 illustrates an embodiment of a system for monitoring data.

FIG. 1 illustrates a simplified example of a network 100. The network 100 may include a network device 110 and a monitoring device 120. The network device 110 may include a plurality of traffic ports 112 for receiving and transmitting network traffic. The network device 110 may also include a mirroring port 114 to transmit copies of packets (or "mirrored packets") to the monitoring device 120. Although only one mirroring port 114 is shown, network device 110 may include more than one mirroring port 114. Even if more than one mirroring port 114 is used, the number of traffic ports 112 may exceed the number of mirroring port(s) 114. Thus, the total bit-rate on the traffic ports 112 may be higher than the available bit rate of the mirroring port(s) 114 and/or the monitoring device(s) 120 connected via the network 100 to the mirroring port(s) 114.

The network device 110 may be linked to the monitoring device 120 through a network 100, creating a link between the network device 110 and the monitoring device 120. The link may include a virtual link, in which the path between the network device 110 and the monitoring device 120 is not preconfigured, or a direct link, where each portion of the path between the network device 110 and monitoring device 120 is preconfigured. The network device 110 may communicate with the monitoring device 120 through the mirroring port 114. Data transmitted on the virtual link between the network device 110 and the monitoring device 120 may be encapsulated in Internet Protocol ("IP") packets.

Figure 2:
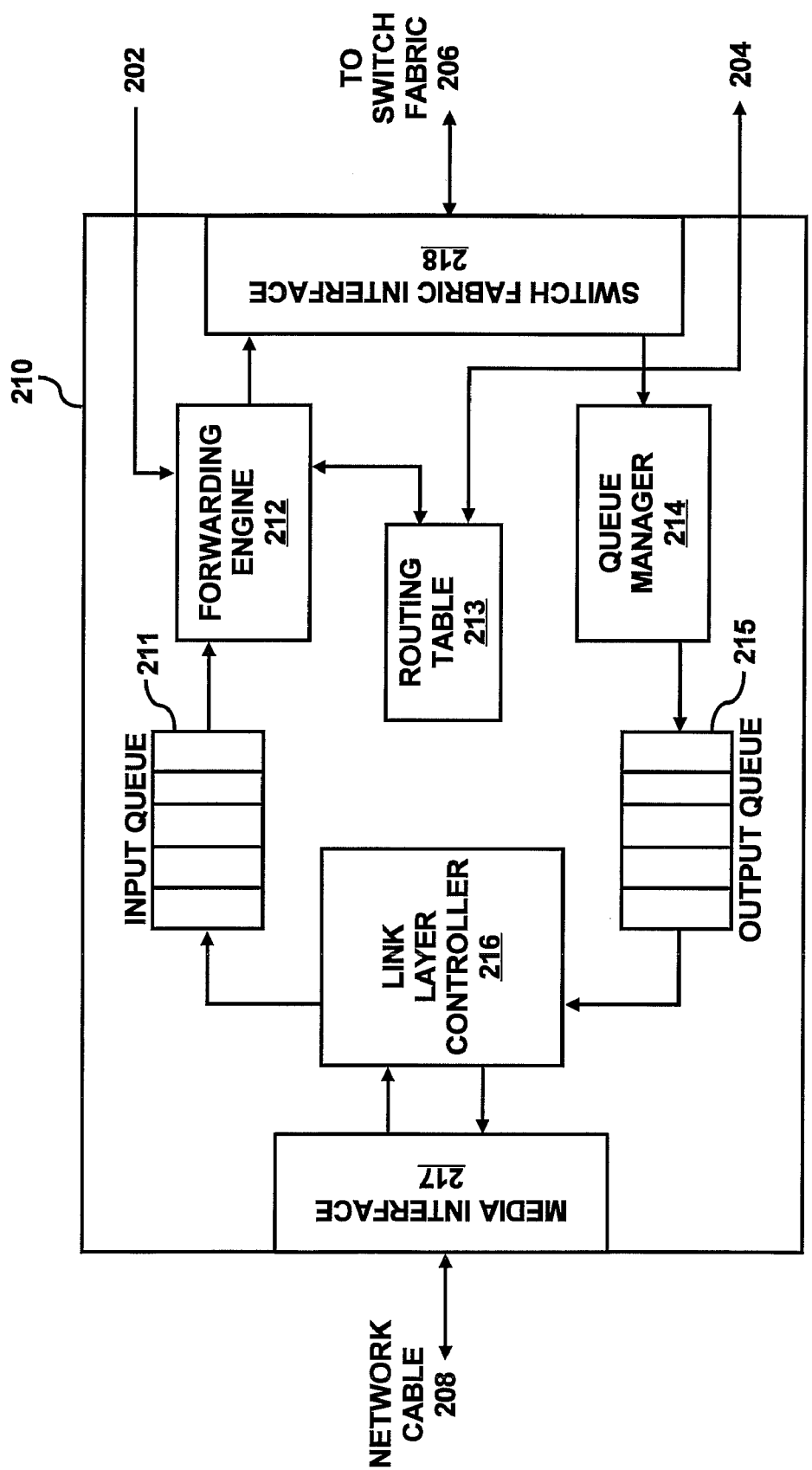
FIG. 2 illustrates an embodiment of a line card usable in a network device configured to support mirroring at data input of the network device.

The network device 110 may include a switch or router or other network device in which data may be received and transmitted. The network device 110 may include one or more line cards 210, as shown in FIG. 2, with each line card 210 supporting one or more ports 112. A line card may also support a mirroring port 114. The line card used for a mirroring port 114 may be of the same type as the line card used for traffic ports 112 since mirroring ports 114 may be designed arbitrarily during operation, and thus, include hardware that is identical to the hardware of the traffic ports 112.

The network device 110 may also include a switch fabric (not shown) and a control system (not shown). The switch fabric may include hardware and/or software to transfer data coming into the network device 110 to the proper port to be transmitted to another network device. The control system may include a processor, such as a general purpose processor or a special-purpose processor.

FIG. 2 illustrates a line card 210 that supports mirroring. The line card 210 shown supports one switch port 112. In other instances, a line card may be configured to implement multiple ports. Typically, a packet-switching or packet-forwarding operation may involve two ports 112, which may be represented, from the point of view of the packet, as an input port and an output port. Although mirroring on an input port is described, the line card 210 may support mirroring on either an input port or an output port.

The line card 210 receives packets over a network connection 208. The network connection may include a cable or a wireless connection. A packet entering the line card 210 is first processed by a media interface 217, and then by a link layer controller 216. The packet is then placed in an input queue buffer 211. Although both an input queue buffer 211 and an output queue buffer 215 are shown, some switches or routers may have one of the input queue buffer 211 and the output queue buffer 215.

A forwarding engine 212 then looks at the destination address in the packet header to determine to which output port 112 to transmit the packet. The forwarding engine 212 may determine which output port 112 to transmit the packet based on a routing table 213 which identifies output ports based on packet attributes, such as, packet type. The forwarding engine 212 then transmits the packet via the switch fabric interface 218 to the switch fabric 206 to transfer the packet to the designated output port 112. The forwarding engine 212 then frees the input queue buffer 211.

In one implementation, when mirroring is enabled for the input port, the routing table 213 may include an extra field indicating an additional output port, which is the designated mirroring port 114 (or one of several designated mirroring ports 114). The routing table entry may also include an extra field indicating a truncation length for packets sent to this mirroring port. A truncation length as referred to herein is a length of a packet or data unit that remains after being truncated. Other methods of truncation will be described below with respect to FIG. 4. The forwarding engine then transmits the packet both to the output port 112 and to the mirroring port 114 before freeing the input queue buffer 211. If the routing table entry contains a truncation length field, then only a prefix of the packet of that length is sent to the mirroring port.

An output port 112 receives the packet via the switch fabric 206 and the switch fabric interface 218, and places it in an output queue buffer 215. The line card 210 may include an output queue manager 214 to order the packets in the output queue buffer 215. The packet is then processed by the link layer controller 216 and the media interface 217 and transmitted out via network cable 208.

When the forwarding engine 212 transmits the packet to the mirroring port 114 to be output, and if a truncation length has been indicated in some way, the forwarding engine 212 sets the mirrored packet length to the minimum of a selected truncation length and the actual packet length, where the selected truncation length is a selected length of the packet after being truncated. Thus the forwarding engine 212 ultimately transmits a truncated packet on its network cable 208.

The forwarding engine 212 may be given truncation length information from some other part of the network device 110, such as a central controller, via control path 202. This truncation length information may be provided via a management console of the network device 110 or via a network protocol entered into by a remote device. The remote device may be linked to the network device 110 through the network 100. The remote device may include the monitoring device 120 or a remote computer system.

Figure 3:
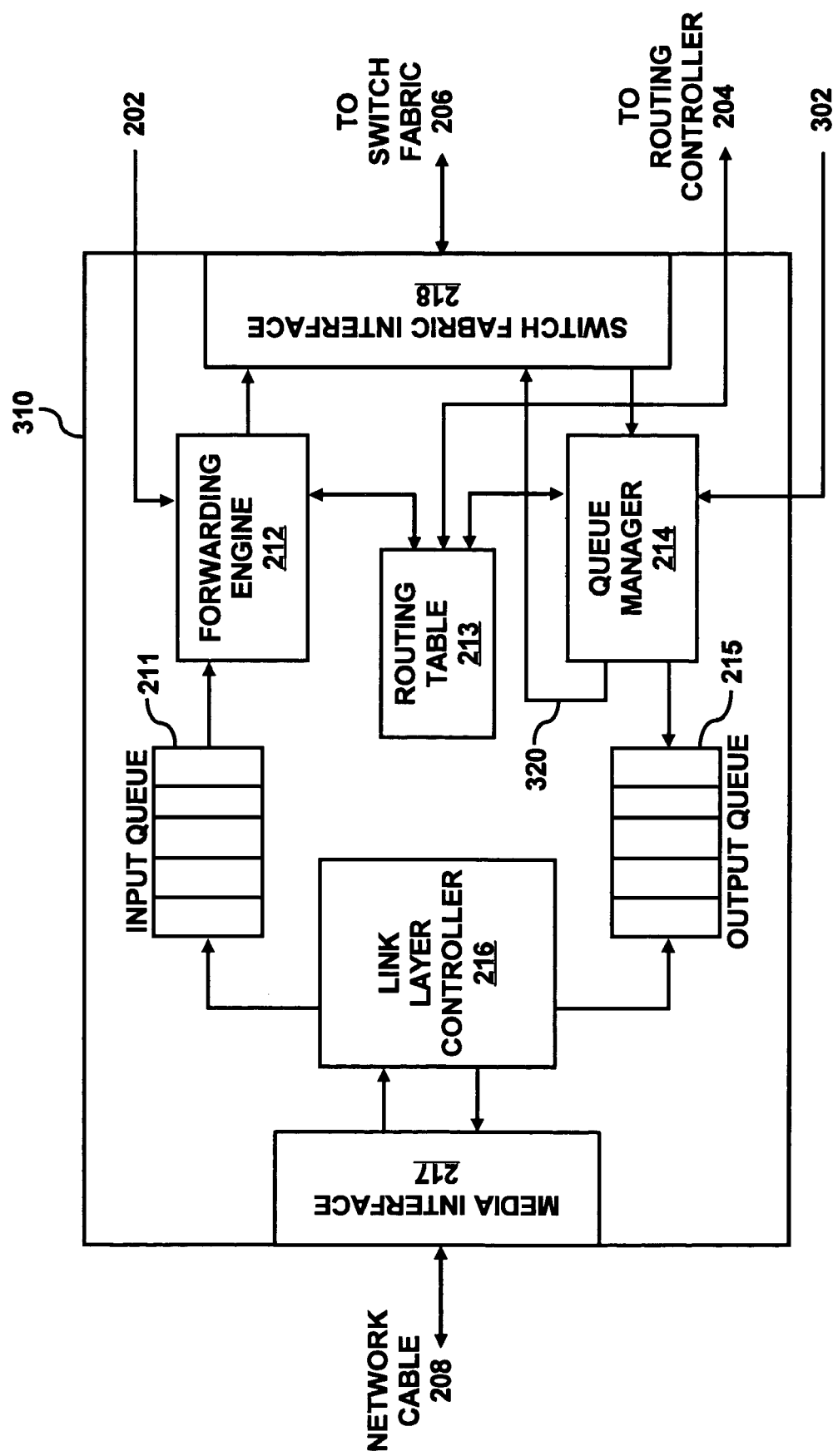
FIG. 3 illustrates an embodiment of a line card usable in a network device configured to support mirroring at data input and at data output of the network device.

FIG. 3 shows an alternative implementation of a line card 310. In line card 310, packets may be mirrored on either input or output. Creation of truncated mirrored packets at an output port is somewhat more complex than mirroring at an input port, since it requires additional data paths through the line card. However, the descriptions of creating truncated mirrored packets at the input port may be extended to creation of truncated mirrored packets at an output port. When the queue manager 214 determines, for example by looking in the routing table 213, that a mirror packet should be created of an outgoing packet, it creates a mirror copy and transmits it via data path 320 and switch fabric interface 218 to the mirroring port indicated in the routing table entry. If a truncation length is indicated in the routing table entry, or via control path 302, the mirrored packet is truncated to that length.

Figure 4:
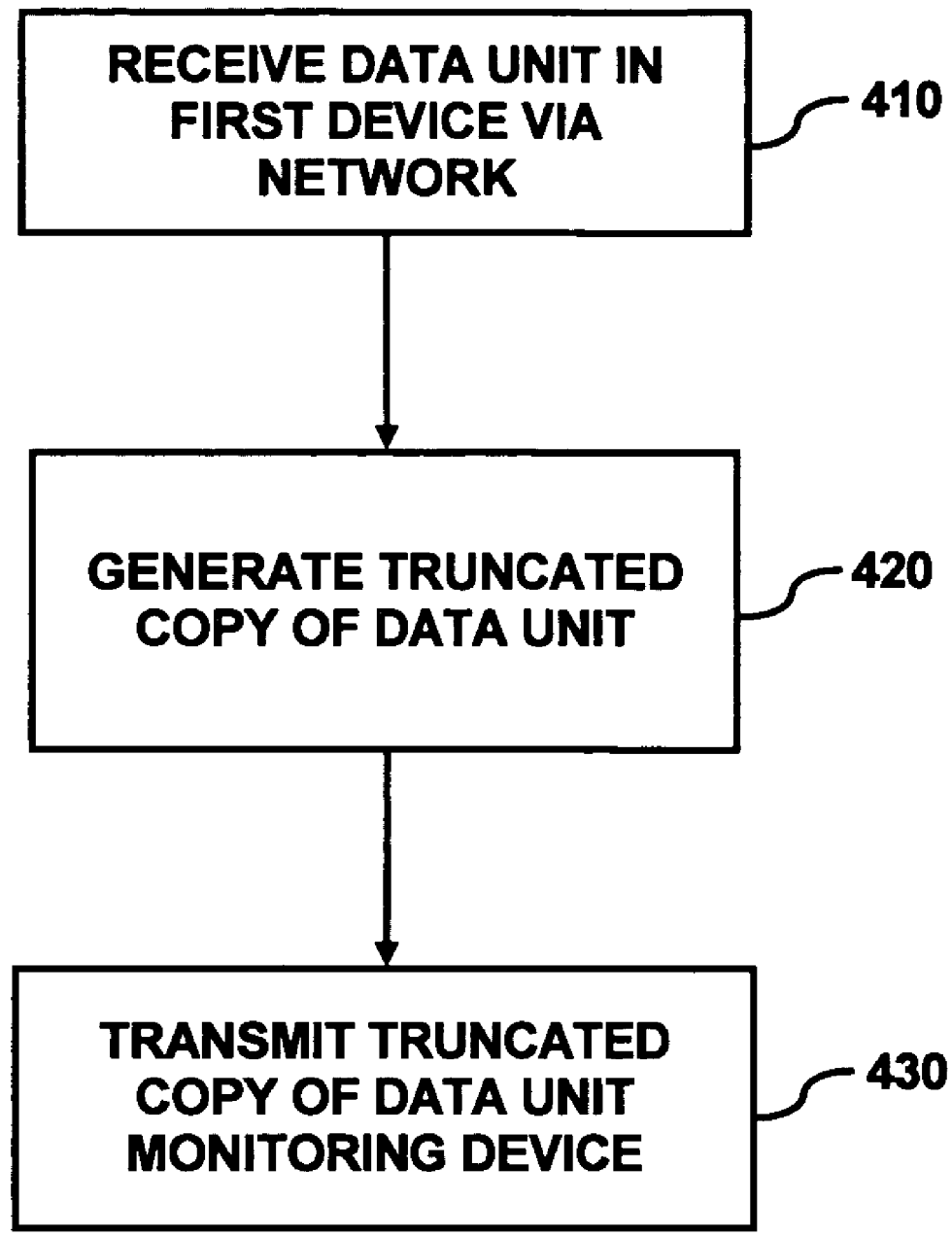
FIG. 4 is a flow chart illustrating an embodiment of a method of monitoring data.

FIG. 4 illustrates a method of monitoring data in a network. The following discussion refers to data units. A data unit may include data packets, datagrams or frames or any collection of data sent over a network, at any layer of the Open Systems Interconnection ("OSI") Model. At step 410, data unit is received in a first device, such as a network device 110 via a network. The first device may include a router or a switch or other device through which data units may be forwarded to another network device 110.

At step 420, the first device generates a truncated copy of the data unit. Generating the truncated copy includes determining if the data unit should be truncated before the truncated copy is transmitted to a monitoring device, such as monitoring device 120. Each data unit may be examined by the first device to determine if the data unit is to be truncated. The decision of whether a data unit is to be truncated may be determined based on the length of the data unit. For example, for a simple truncation application, the length of each data unit permitted to be transmitted to the monitoring device may be set at a length $L_{max}$. If the data unit exceeds the length $L_{max}$, the data unit may be truncated to a length $L_{trunc}$. If the data unit does not exceed the length $L_{max}$, the data unit would not need to be truncated. The length $L_{max}$ may be a predetermined length for a simple truncation, or may be determined dynamically based on bandwidth or other considerations.

Thus, if it is determined that the data unit is to be truncated, the data unit may be truncated according to a truncation application. As described above, the truncation application may be a simple truncation where all data beyond a certain length $L_{max}$ is truncated.

Generating a truncated copy of the data unit may also include determining a truncation length as a function of at least one of a maximum bandwidth of a mirroring port, a maximum bandwidth of the link or a maximum bandwidth of the monitoring device.

In some techniques, the truncation application may include monitoring the bandwidth consumed by data units transmitted by the mirroring port to the monitoring device, and varying the truncation length based on a feedback control algorithm to avoid exceeding a specified bandwidth limit. The truncation length is then increased or decreased, between configured upper and lower limits, to maintain an average bandwidth no greater than the specified bandwidth limit. For example, the bandwidth limit may include a maximum bandwidth for the monitoring device, the mirroring port or the link between the monitoring device and the mirroring port. The maximum bandwidth may include a predetermined maximum bandwidth or a dynamic maximum bandwidth determined through feedback. The feedback may include interaction with a remote computer system. The remote computer system may include the monitoring device or another remote computer system. The dynamic maximum bandwidth may be determined based on measurement or by detecting capacity of the monitoring device, the mirroring port, and/or the link between the monitoring device and the mirroring port. The amount of data transmitted to the monitoring device may be calculated over a specified time interval. Then, the available bandwidth for transmitting additional data may be calculated based on comparison with the maximum bandwidth for the monitoring device, the mirroring port, and/or the link between the monitoring device and the mirroring port.

The truncation application may also impose a minimum limit for the truncation length, to avoid sending fragmentary data units that are too small to be useful. This minimum length may be configured by the operator of the network device, or may be set by the designer of the network device. The truncation application may be executed by a central controller.

In some techniques, the truncation application may include examining incoming data units and selecting a truncation length for each data unit individually. Thus, generating the truncated copy may include generating the truncated copy as a function of at least one of length of the data unit, type of the data unit, origination of the data unit and destination of the data unit. Generating the truncated copy of the data unit may further include using a lookup table to determine truncation length based on at least one of data unit type, data unit origination or data unit destination. For example, the amount a packet is truncated may be based on from where the packet is coming or to where the packet is going. In another example, TCP packets may be truncated after the TCP header, whereas UDP packets may be truncated after the (shorter) UDP header. Truncation length selection may be performed using a lookup table listing truncation length, for example, based on types of data units, destinations of data units, origination of data units, and so on. In other techniques, the truncation length may be determined by examining data unit headers and setting the truncation length to preserve all layers of the data unit headers known to the network.

Programs that select a truncation length for each data unit individually may be written in a filter language, such as Berkeley packet filter ("BPF"). BPF provides the ability to choose a truncation length as the result of a filter (program) execution for packets flowing across the interface between two layers of software. Thus, a BPF-type application may be adapted to individually truncate data units flowing between two ports in a switch or router. Although BPF itself may be too expensive to execute on a per data unit basis in current switch or router hardware, simpler languages or faster hardware may be used to implement a per data unit truncation.

At step 430, the truncated data unit copy is transmitted to a monitoring device. Transmitting the truncated data unit copy may also include IP encapsulating the data unit copy. IP encapsulating the data unit copy may include adding an IP header to the data unit copy. The IP header includes a preconfigured destination IP address to the destination to which the data unit copies are to be transmitted, such as the monitoring device.

Transmitting the data unit copy to the monitoring device may also include transmitting additional information regarding the data unit with the data unit. For example, the monitoring device may want to know the actual length of each original data unit before it was truncated. Thus, the first device may prepend all data unit copies transmitted via the mirroring port to the monitoring device with a data unit header that specifies the actual length of the original data unit. Alternatively, this information may be appended to the end of each data unit copy (truncated or not) as a data unit trailer.

However, if a truncated packet is only slightly shorter than the maximum allowable packet length, then adding such a data unit header and/or data unit trailer could cause the result to exceed parameters limiting data unit length. For example, the parameters limiting data unit length may include a maximum allowable data unit length or the maximum bandwidth for the monitoring device. In this situation, the first device may refuse to allow the configuration of a truncation length of a sum of the lengths of the data unit and the additional data unit header and/or data unit trailer that exceeds the parameters limiting the data unit length. This sum may also include the length of any IP encapsulation header.

The "refusal" may be done as part of a configuration (system management) mechanism, such as a local console or a remote management protocol. For example, if an operator attempts to set a truncation length that is too high to allow the addition of header/trailer bytes to the packet, the configuration mechanism would simply refuse to change the configuration (i.e., refuse to change its idea of the truncation length). In another example, if the operator first sets a truncation length and then, requests the addition of header/trailer bytes that would result in an oversized packet, the configuration mechanism would instead refuse to allow this request.

If the header or trailer mechanism is provided, the header or trailer may also include a timestamp indicating when the packet was originally received at the input port. Such timestamps may be used, for example, in network monitoring and measurement applications. The timestamp resolution and accuracy may be chosen to provide sufficient resolution and accuracy for such applications.

The data unit may be transmitted to a second device, such as a second network device 110, through a traffic port 112.

Figure 5:
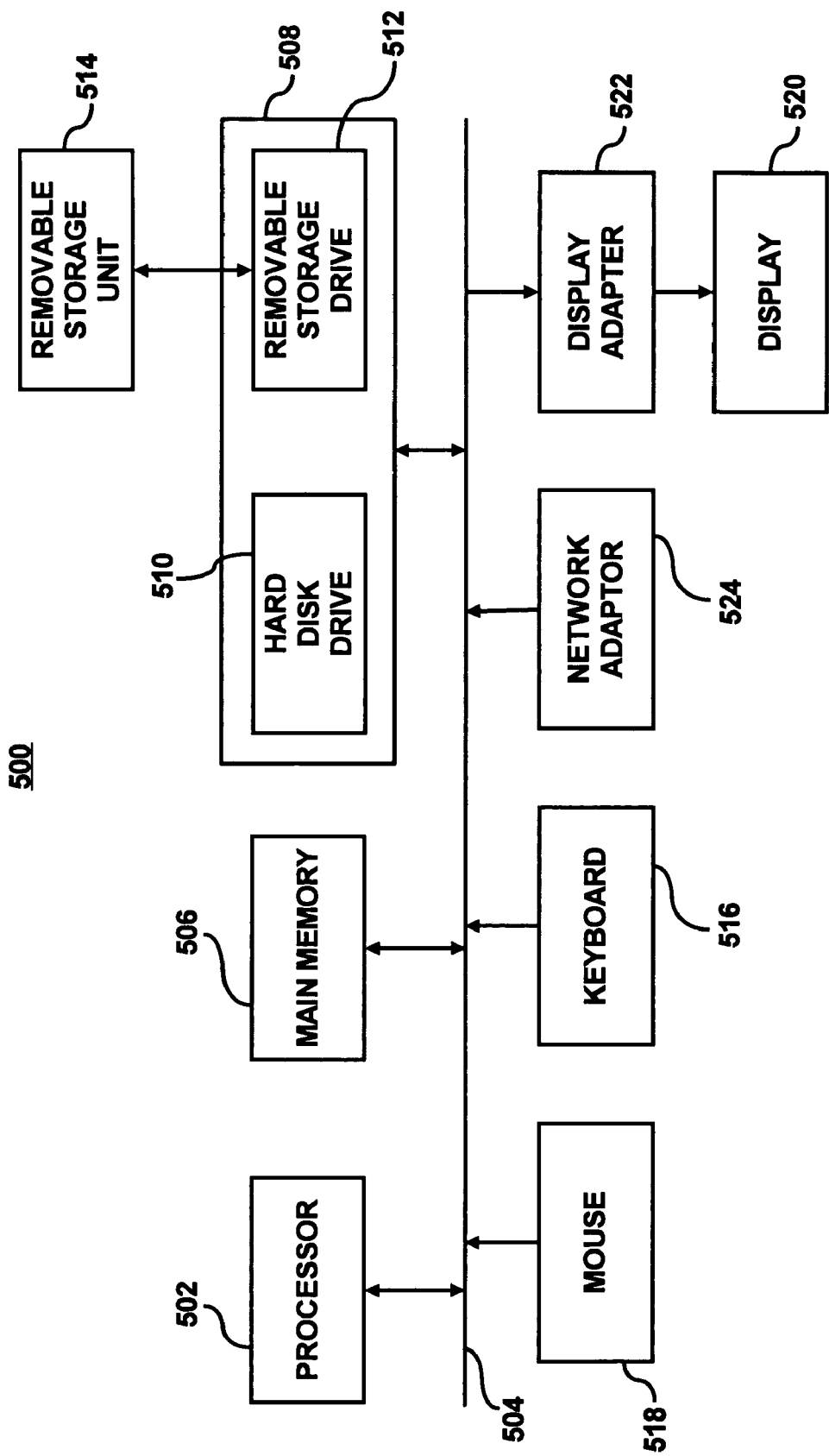
FIG. 5 is a block diagram illustrating a computer system operable to perform the method depicted in FIG. 4.

FIG. 5 illustrates an exemplary computer system 500 operable to control the data mirroring process described with respect to the method 400. In this respect, the computer system 500 may be used as a platform for executing one or more of the functions described hereinabove with respect to the various steps outlined in the method 400.

The computer system 500 includes one or more controllers, such as a processor 502. The processor 502 may be used to execute some or all of the steps described in the method 400. Commands and data from the processor 502 are communicated over a communication bus 504. The computer system 500 also includes a main memory 506, such as a random access memory (RAM), where a program code may be executed during runtime, and a secondary memory 508. The secondary memory 508 includes, for example, one or more hard disk drives 510 and/or a removable storage drive 512, representing a floppy diskette drive, a magnetic tape drive, a compact disk drive, etc., where a copy of the program code for the method 400 may be stored.

The removable storage drive 512 reads from and/or writes to a removable storage unit 514 in a well-known manner. User input and output devices may include a keyboard 516, a mouse 518, and a display 520. A display adaptor 522 may interface with the communication bus 504 and the display 520 and may receive display data from the processor 502 and convert the display data into display commands for the display 520. In addition, the processor 502 may communicate over a network, for instance, the Internet, LAN, etc., through a network adaptor 524.

It will be apparent to one of ordinary skill in the art that other known electronic components may be added or substituted in the computer system 500. In addition, the computer system 500 may include a system board or blade used in a rack in a data center, a conventional "white box" server or computing device, etc. Also, one or more of the components in FIG. 5 may be optional (for instance, user input devices, secondary memory, etc.).

The approach described above may also be applied to help solve the privacy problems inherent in network packet monitoring. In some scenarios, while the packet headers themselves are not privacy-critical, the packet bodies (data) may be private and should not be revealed to the monitoring system.

By truncating the packets at the switch or router, rather than at the monitoring system, the network manager can reduce the chances of private information being compromised.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method comprising:
   receiving a data unit at a first device via a network;
   generating a truncated copy of the data unit at a first port of the first device, wherein generating a truncated copy of the data unit comprises monitoring a bandwidth capacity of at least one of the first device, a monitoring device, and a link between the first port and the monitoring device, and varying a length of the truncated copy of the data unit based on the monitored bandwidth capacity; and
   transmitting the truncated copy of the data unit to the monitoring device through the link.

2. The method of claim 1, further comprising selecting one of a plurality of output ports of the first device based on a destination address in the data unit and transmitting the data unit to a second device through the selected output port, wherein the plurality of output ports are available for transmitting data units, including the data unit, received at the first.

3. The method of claim 1, wherein generating a truncated copy of the data unit further comprises monitoring a bandwidth consumed by data units transmitted by the first port of the first device and varying the length of the truncated copy of the data unit based on the monitored bandwidth consumption.

4. The method of claim 1, wherein the truncated copy of the data unit has at least a predetermined minimum truncated length greater than zero, the predetermined minimum truncated length being a minimum length set for truncated copies of data units, including the truncated copy of the data unit, that are generated at the first port of the first device.

5. The method of claim 1, further comprising appending additional information to the truncated copy of the data unit.

6. The method of claim 5, wherein the additional information is appended as at least one of a header portion of the truncated copy of the data unit and a trailer portion of the truncated copy of the data unit.

7. The method of claim 5, further comprising determining if the truncated copy of the data unit including the appended additional information exceeds a parameter Limiting data unit length, and removing the appended information before transmitting the truncated copy of the data unit if the truncated copy of the data unit including the appended additional information exceeds the parameter limiting data unit length.

8. The method of claim 5, wherein the additional information comprises a timestamp for the arrival of the data unit at the first device.

9. The method of claim 1, wherein the data unit comprises a data packet.

10. A network device comprising:
    a first port configured to receive, a data unit via a network;
    a forwarding engine configured to control a generation of a truncated copy of the data unit and a transmission of the truncated copy of the data unit to a second port, wherein forwarding engine first port is further configured to control a variation of a length of the truncated copy of the data unit based on a monitored bandwidth capacity, wherein the monitored bandwidth capacity is a monitored bandwidth capacity of at least one of the network device, a monitoring device, and a link between the second port and the monitoring device;
    the second port configured to transmit the truncated copy of the data unit to the monitoring device through the link.

11. The network device of claim 10, wherein the forwarding engine is further configured to control a selection of one of a plurality of output ports of the network device based on a destination address in the data unit and a transmission of the data unit to another device through the selected output port, wherein the plurality of output ports are available for transmitting data units, including the data unit, received at the network device.

12. The network devices of claim 10, wherein the forwarding engine is further configured to control appending additional information to the truncated copy of the data unit.

13. The network device of claim 10, wherein the forwarding engine is further configured to vary the length of the truncated copy of the data unit based on a monitored bandwidth consumption by data units transmitted at the second port of the network device.

14. A computer readable storage medium on which is embedded one or more computer programs, said one or more computer programs comprising a set of instructions for:
    receiving a data unit at a first device via a network;
    generating a truncated copy of the data unit at a first port of the first device, wherein generating the truncated copy of the data unit comprises monitoring a bandwidth consumed by data units transmitted at the first port of the first device and varying a length of the truncated copy of the data unit based on the monitored bandwidth consumption; and
    transmitting the truncated copy of the data unit to a monitoring device through a link.

15. The computer readable medium of claim 14, wherein said one or more computer programs further comprises instructions for:
    monitoring a bandwidth capacity of at least one of the first device, the monitoring device, and the link, and varying the length of the truncated copy of the data unit based on the monitored bandwidth capacity.

* * * * *

UNITED STATES PATENT AND TRADEMARK OFFICE
CERTIFICATE OF CORRECTION

PATENT NO. : 7,512,705 B2  Page 1 of 1
APPLICATION NO. : 11/000396
DATED : March 31, 2009
INVENTOR(S) : Jeffrey Mogul It is certified that error appears in the above-identified patent and that said Letters Patent is hereby corrected as shown below:

In column 7, line 32, in Claim 2, delete "first." and insert -- first device. --, therefor.

In column 7, line 53, in Claim 7, delete "Limiting" and insert -- limiting --, therefor.

In column 8, line 7, in Claim 10, after "receive" delete ",".

In column 8, line 28, in Claim 12, delete "devices" and insert -- device --, therefor.

Signed and Sealed this

Fourth Day of August, 2009

JOHN DOLL
*Acting Director of the United States Patent and Trademark Office*